US012460782B2

(12) United States Patent
Lee et al.

(10) Patent No.: US 12,460,782 B2

(45) Date of Patent: Nov. 4, 2025

(54) LAMP

(71) Applicant: HYUNDAI MOBIS CO., LTD., Seoul (KR)

(72) Inventors: Hyun Soo Lee, Yongin-si (KR); Sun Kwon Mun, Yongin-si (KR); Na Ram Jun, Yongin-si (KR); Tae Yang Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/794,091

(22) Filed: Aug. 5, 2024

(65) Prior Publication Data

US 2025/0052390 A1 Feb. 13, 2025

(30) Foreign Application Priority Data

Aug. 7, 2023 (KR) ........................ 10-2023-0103047

(51) Int. Cl.

*F21S 41/24* (2018.01)
*F21S 41/143* (2018.01)
*F21W 102/13* (2018.01)

(52) U.S. Cl.

CPC ............. *F21S 41/24* (2018.01); *F21S 41/143* (2018.01); *F21W 2102/13* (2018.01)

(58) Field of Classification Search

CPC .......... F21S 41/24; F21S 41/26; F21S 41/143; F21W 2102/13

See application file for complete search history.

(56) References Cited

U.S. PATENT DOCUMENTS 10,473,286 B2 * 11/2019 Nishimura ............ F21S 41/143
11,371,669 B2 * 6/2022 Kemetmüller .......... F21S 41/24

* cited by examiner

*Primary Examiner* — Matthew J. Peerce

(74) *Attorney, Agent, or Firm* — Novo TechIP International PLLC

(57) ABSTRACT

A lamp including a light source that outputs light, a light output part that outputs the light output from the light source, and a guide part that guides travel of the light output from the light source to the light output part. The guide part extends from the light source, at a front side of the lamp, to the light output part, at a rear side of the lamp. The guide part is divided into a plurality of areas with respect to a forward/rearward direction of the lamp, and a width of one of the areas located on a relatively front side of the guide part in a leftward/rightward direction of the lamp is greater than a width of another one of the areas located on a relatively rear side of the guide part in the leftward/rightward direction.

6 Claims, 13 Drawing Sheets

LAMP

CROSS-REFERENCE TO RELATED APPLICATIONS

This application claims the benefit of priority to Korean Patent Application No. 10-2023-0103047, filed in the Korean Intellectual Property Office on Aug. 7, 2023, the entire contents of which are incorporated herein by reference.

TECHNICAL FIELD

The present disclosure relates to a lamp.

BACKGROUND

Various types of vehicle lamps are mounted on vehicles depending on their functions. For example, a low beam lamp, a high beam lamp, and a daytime running light (DRL) lamp are mounted on a front side of a vehicle. Among them, the low beam lamp forms a light distribution pattern having a cutoff line shape at an upper portion thereof.

In detail, the low beam lamp has a primary optical system that collects the light output from a light source, a light guide that guides travel of the light that passed through the primary optical system to a front side, and a secondary optical system that outputs the light that passed through the light guide to form a light distribution pattern.

A conventional light guide has a shape that extends in a forward/rearward direction so that a width thereof in the leftward/rightward direction is constant between the primary optical system and the secondary optical system. A portion of the light that passed through the primary optical system is reflected from the light guide and then is totally reflected by the light output surface of the secondary optical system and is not output to a front side. Because the light that is not output to the front side cannot be used to form a light distribution pattern, and thus, a light output efficiency of the lamp is decreased.

SUMMARY

The present disclosure has been made to solve the above-mentioned problems occurring in the prior art while advantages achieved by the prior art are maintained intact.

An aspect of the present disclosure provides a lamp that minimizes light totally reflected from a light output surface whereby a light output efficiency is improved.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp includes a light source that outputs light, a light output part disposed on a front side of the light source, and that outputs the light output from the light source after the light is input, and a guide part that guides travel of the light output from the light source such that the light travels to the light output part, and extending from the light output part to a rear side, the guide part is divided into a plurality of areas with respect to a forward/rearward direction, and a width of an area located on a relatively front side in a leftward/rightward direction, in at least some of the plurality of areas, is greater than a width of an area located on a relatively rear side in the leftward/rightward direction.

Furthermore, the guide part may have a shape, of which a width in the leftward/rightward direction becomes smaller as it goes to a rear side.

Furthermore, inclined surfaces extending to be inclined to a rear side to be inclined to an inside of the lamp may be formed in a left side and a right side of the guide part, respectively.

Furthermore, when an imaginary plane passing through a center of the lamp and being perpendicular to the leftward/rightward direction is a reference plane, a left inclined surface provided on a left side of the guide part and a right inclined surface provided on a right side of the guide part may have shapes being symmetrical to each other with respect to the reference plane.

Furthermore, the lamp may further include a light input part, to which the light output from the light source is input, and disposed at a rear end of the guide part, and the light input part may include a light input central part that refracts a central light being any portion of the light output from the light source such that the central light travels toward a focus of the light output part, and a light input outskirt part totally reflects a peripheral light being another portion of the light output from the light source such that the peripheral light travels toward a focus of the light output part, and surrounding the light input central part.

Furthermore, when, among the inclined surfaces of the guide part, an inclined surface provided on one side of the guide part in the leftward/rightward direction is a first inclined surface, the first inclined surface may reflect a portion of the light totally reflected by the light input outskirt part to an opposite side in the leftward/rightward direction.

Furthermore, the light output from the light output part may form a low beam light distribution pattern, the low beam light distribution pattern may include a hot zone, and a wide zone, a luminous intensity of which is lower than the hot zone, and when, among the inclined surfaces of the guide part, an inclined surface provided on an opposite side of the guide part in the leftward/rightward direction is a second inclined surface, the light output from the light output part after being reflected by the first inclined surface may form an opposite side of the wide zone in the leftward/rightward direction, and the light output from the light output part after being reflected by the second inclined surface may form one side of the wide zone in the leftward/rightward direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
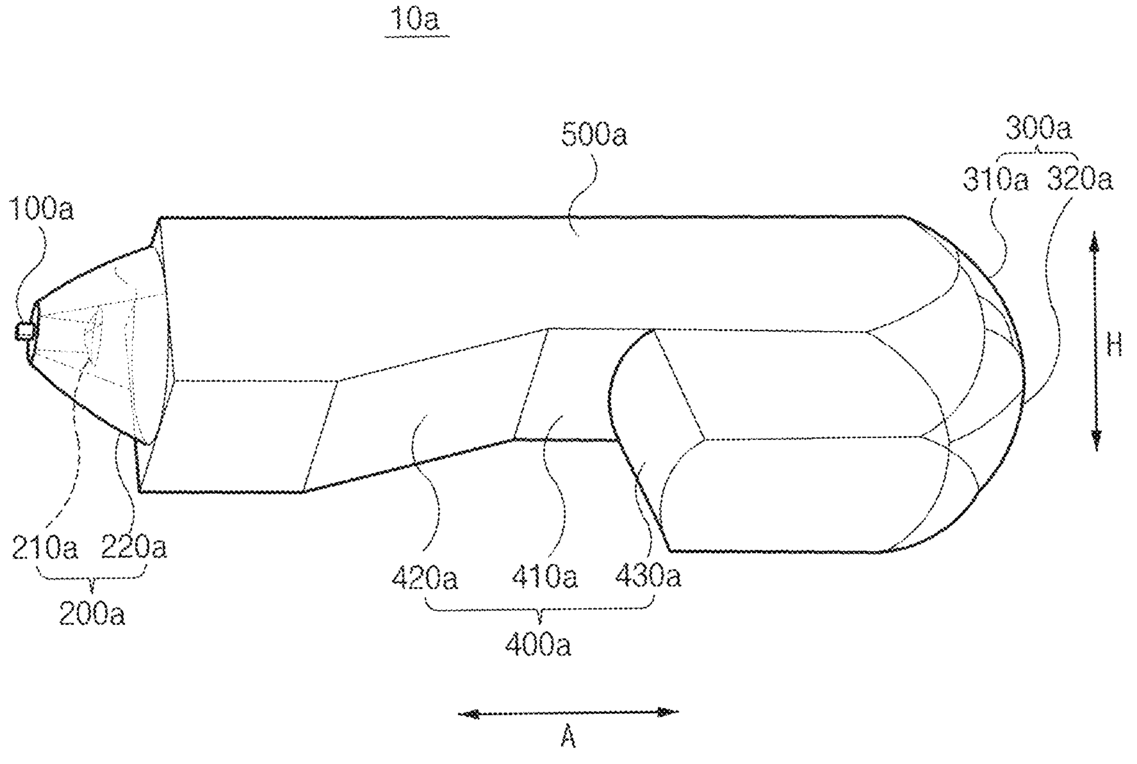
FIG. 1 is a perspective view of a lamp according to a first embodiment of the present disclosure.
Figure 2:
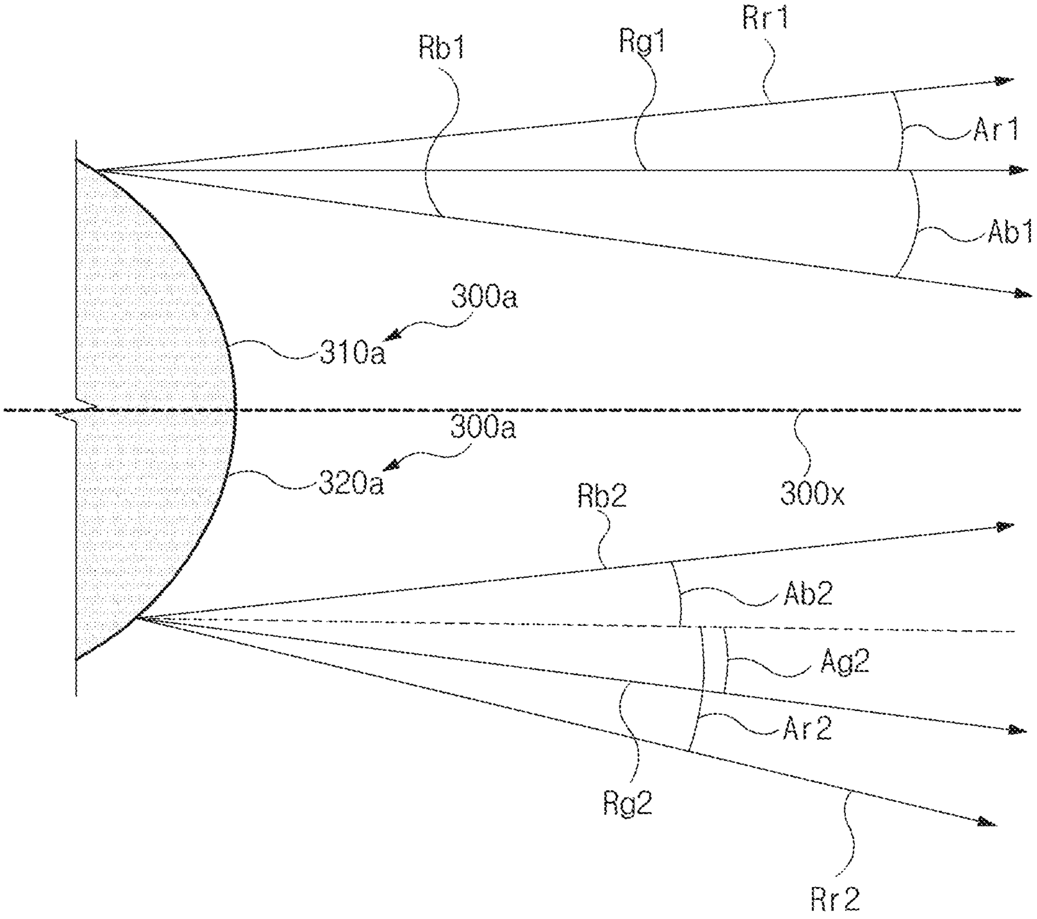
FIG. 2 is a longitudinal cross-sectional view of a light output part according to a first embodiment of the present disclosure.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. When it is described that a certain component is "input to", "passes through" or "output from" a second component, it should be understood that the component may be directly input to, passes through, or output from the second component, but a third component may be "input" or "pass", or "output" between the components.

First Embodiment

Hereinafter, a lamp 10*a* according to a first embodiment of the present disclosure will be described with reference to FIGS. 1 to 6.

Referring to FIG. 1, the lamp 10*a* may be a vehicle lamp that is provided in a vehicle. For example, the lamp 10*a* may be a headlamp that is provided on both left and right sides of a front side of the vehicle. The lamp 10*a* may form a low beam light distribution pattern to ensure a visibility of a driver. The low beam light distribution pattern may include a cutoff line, a hot zone, and a wide zone. The cutoff line may define an upper end of the low beam light distribution pattern. The hot zone may define a central portion of the low beam light distribution pattern. Furthermore, the wide zone may define a peripheral portion of the light distribution pattern, which surrounds the hot zone, and may have a luminous intensity that is lower than that of the hot zone. The lamp 10*a* may include a light source 100*a*, a light input part 200*a*, a light output part 300*a*, a shield part 400*a*, and a guide part 500*a*.

Figure 3:
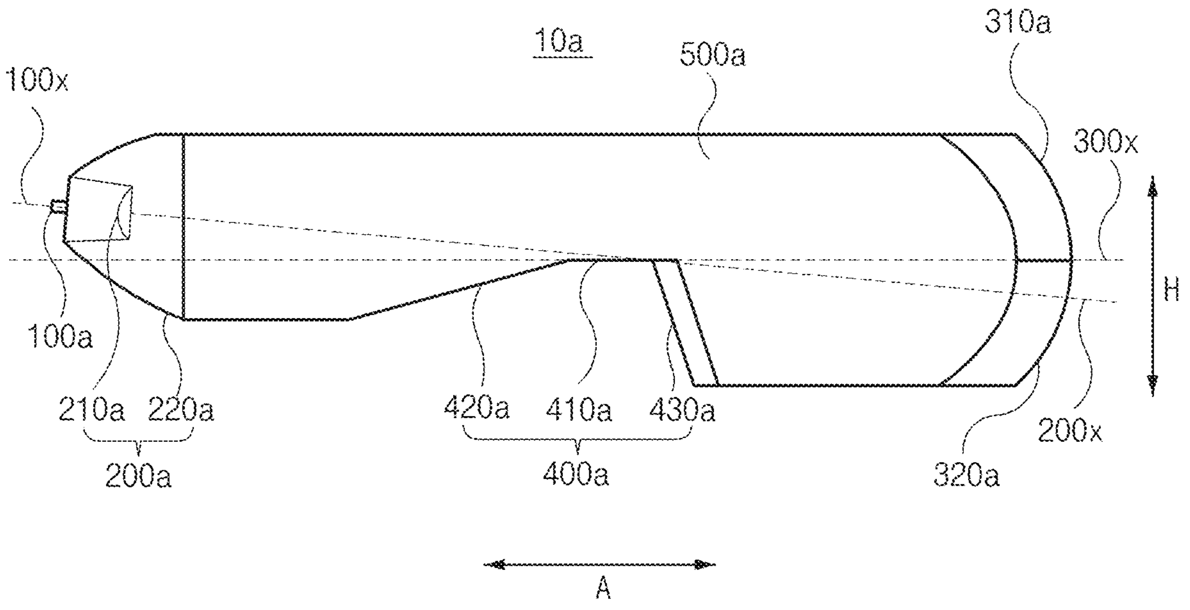
FIG. 3 is a longitudinal cross-sectional view of a lamp according to a first embodiment of the present disclosure.

The light source 100*a* is located at a rear side of the lamp 10*a* (e.g., the left side in FIG. 1) and may output light (e.g., see FIG. 3). As an example, the light source 100*a* may be a light emitting diode (LED). The light output from this light source 100*a* may be spread around a light source optical axis 100*x*. The light source optical axis 100*x* may mean an optical axis of the light source 100*a*. The light source optical axis 100*x* may be defined as an imaginary straight line that passes through a center of the light source 100*a* and extends along a travel direction of the output light. The light source optical axis 100*x* may be formed to be inclined toward a front side and a lower side with respect to a forward/rearward direction "A".

The light emitted from the light source 100*a* may be input to the light input part 200*a*. The light that passed through the light input part 200*a* may be input to the guide part 500*a*. The light input to the guide part 500*a* may travel toward a focus of the light output part 300*a*. In other words, the light input to the guide part 500*a* may be condensed at a focus of the light output part 300*a*.

The light input part 200*a* may be disposed on a front side of the light source 100*a*. Furthermore, as an example, the light input part 200*a* may be spaced apart from the light source 100*a*. Furthermore, a front end of the light input part 200*a* may be attached to a rear end of the guide part 500*a*. In other words, the light input part 200*a* may be disposed between the light source 100*a* and the guide part 500*a* with respect to the forward/rearward direction "A".

A light input groove that is recessed to a front side may be formed in the light input part 200*a*. The light output from the light source 100*a* may pass through the light input groove, and then may reach a light input area that is an area that surrounds the light input groove. The light that reached the light input area may be refracted in the light input area.

Referring back to FIG. 3, a light input optical axis 200*x* that is an optical axis of the light input part 200*a* may be formed in parallel to a light source optical axis 100*x*. The light input optical axis 200*x* may be defined as an imaginary straight line that passes through a center of the light input part 200*a* and a focus of the light output part 300*a*. Furthermore, the focus of the light output part 300*a* may be disposed on an upper side of a front end of a reflection area 410*a* that will be described later.

The features of the light source 100*a*, the light input part 200*a*, the light output part 300*a*, the shield part 400*a*, and the guide part 500*a* described in the specification may be understood as features that may satisfy geometric characteristics, in which the light input optical axis 200*x* passes through a center of the light input part 200*a* and a focus of the light output part 300*a*.

Furthermore, the geometric characteristics of the light source optical axis 100*x*, the light input optical axis 200*x*, and a light output optical axis 300*x* in the specification may be satisfied by a combination of at least some of the configurations according to first to fifth embodiments in the specification, and the satisfaction is not limited to a combination of the configurations according to any one embodiment.

In detail, any one of light sources 100*a*, 100*b*, 100*c*1, 100*c*2, 100*d*, and 100*e*, any of light input parts 200*a*, 200*a*', 200*a*", 200*a*"', 200*b*, 200*c*1, 200*c*2, 200*d*, and 200*e*, any one of light output parts 300*a*, 300*b*, 300*c*1, 300*c*2, 300*d*, and 300*e*, any one of shield parts 400*a*, 400*b*, 400*c*1, 400*c*2, and 400*d*, and any one of guide parts 500*a*, 500*b*, 500*c*1, 500*c*2, 500*d*, and 500*e* that are components according to the first to fifth embodiments in the specification may be combined with each other, and only the components of any one embodiment are not combined in a limited way.

The light input optical axis 200*x* and the light output optical axis 300*x* may be nonparallel to each other. The light output optical axis 300*x* may mean an optical axis of the light output part 300*a*. For example, the light input optical axis 200*x* may be an imaginary straight line that extends to be inclined to a front side and a lower side with respect to the light output optical axis 300*x*.

In other words, when the lamp 10*a* is viewed in the leftward/rightward direction, the light input optical axis 200*x* and the light output optical axis 300*x* may cross each other at one point. As a detailed example, the light input optical axis 200*x* and the light output optical axis 300*x* may cross each other on an upper side of a front end of the reflection area 410*a*.

Figure 7:
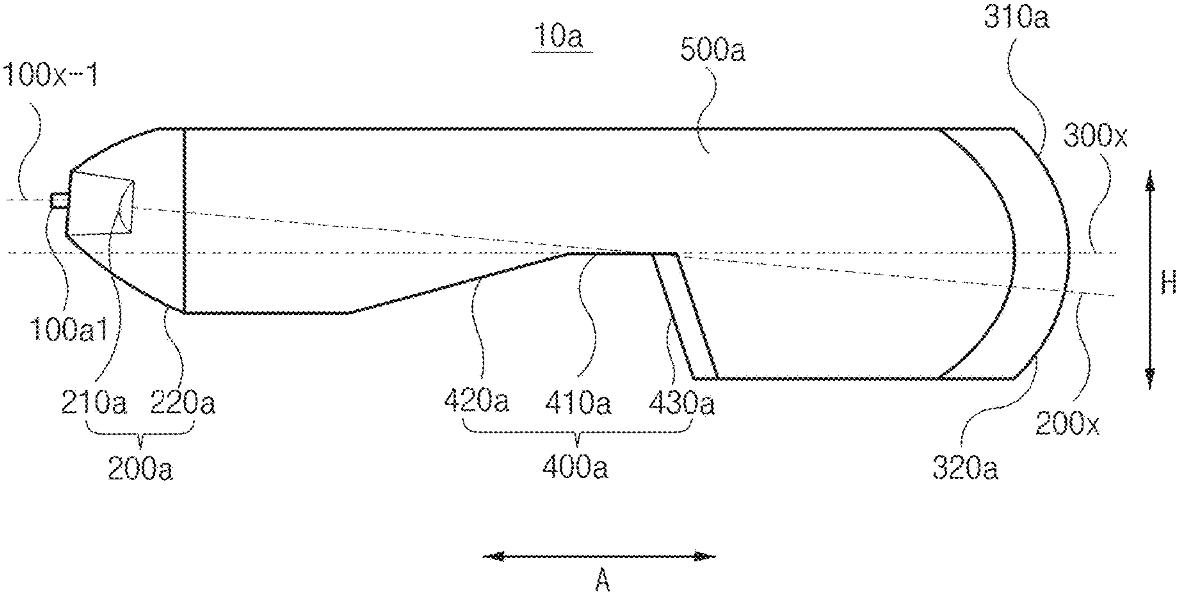
FIG. 7 is a longitudinal cross-sectional view of a lamp according to a first modification of the present disclosure.

Meanwhile, the idea of the present disclosure is not limited thereto, and according to the first modification of the present disclosure, the light input optical axis 200*x* and a light source optical axis 100*x*-1 may be nonparallel to each other. Referring to FIG. 7, the light source optical axis 100*x*-1 may be formed in parallel to a forward/rearward direction "A". In other words, when the lamp 10*a* is viewed in the leftward/rightward direction, the light source optical axis 100*x*-1 and the light input optical axis 200*x* may cross each other at one point. Furthermore, the light source optical axis 100*x*-1 may be disposed in parallel to the light output optical axis 300*x*.

In this way, when the light source optical axis 100*x*-1 is formed in parallel to the forward/rearward direction "A", a heat sink (not illustrated), on which the light source 100*a* is seated, may be oriented not to be inclined with respect to the forward/rearward direction "A". As an example, the heat sink may be disposed on a rear side of the light source 100*a*.

Furthermore, a front end of a reflection area 410*b* may be disposed on a lower side of the focus of the light output part 300*a*, or may be located at the same height as that of the focus.

The light input part 200*a* may include a light input central part 210*a* and a light input outskirt part 220*a*.

The light input to the light input central part 210*a* may be refracted in the light input central part 210, and then may travel to the focus of the light output part 300*a*. The light input central part 210*a* may define a central portion of the light input part 200*a*. The light input central part 210*a* may be disposed to face the light source 100*a*. The light input central part 210*a* may have a shape that is convex to a rear side. The rear side of the light input central part 210*a* may define a front side of the light input area.

The light input to the light input outskirt part 220*a* may be totally reflected in the light input outskirt part 220*a*, and then may travel to the focus of the light output part 300*a*. For example, the light may be input to the inner area of the light input outskirt part 220*a*, and the light may be totally reflected in the outer area of the light input outskirt part 220*a*. An inner area of the light input outskirt part 220*a* may define an inner peripheral surface of the light input area. For example, the inner area of the light input outskirt part 220*a* may extend from a rear side of the light input central part 210*a* to a rear side. Furthermore, an outer area of the light input outskirt part 220*a* may extend from a rear end of the inner area of the light input outskirt part 220*a* to a front side.

The light that passed through the inner area of the light input outskirt part 220*a* may be refracted, and then may reach the outer area of the light input outskirt part 220*a*. The light input outskirt part 220*a* may define an outskirt part of the light input part 200*a*. The light input outskirt part 220*a* may have a shape that surrounds the light input central part 210*a*.

Figure 4:
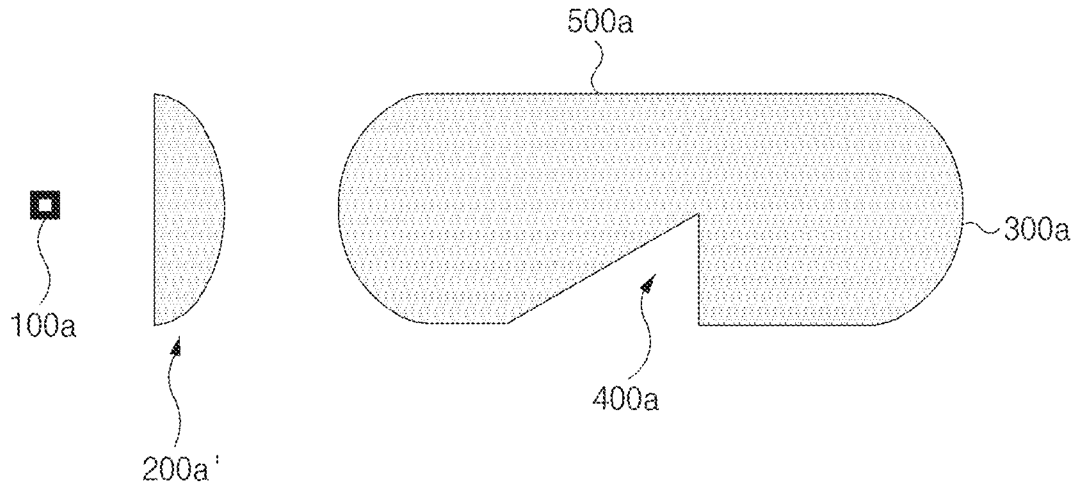
FIG. 4 is a view illustrating a light input part provided with an aspheric lens.
Figure 5:
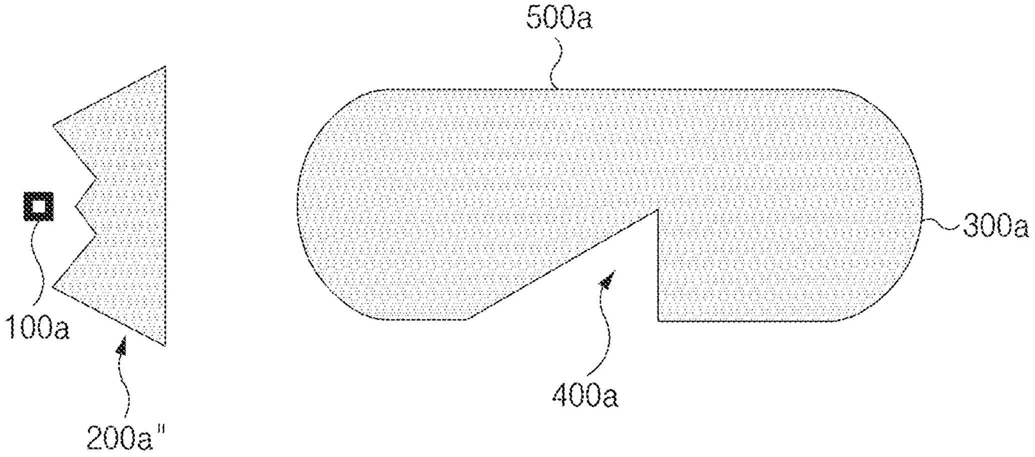
FIG. 5 is a view illustrating the light input part provided with a TIR lens.

Meanwhile, the light input part 200*a* according to the first embodiment of the present disclosure is not limited to the above-described contents, and referring to FIGS. 4 and 5, light input parts 200*a*' and 200*a*" according to embodiments that are different from the first embodiment may be provided as collimators. The collimator may form parallel light (for example, light that is parallel to the forward/rearward direction).

The light input parts 200*a*' and 200*a*" may be disposed between the light source 100*a* and the guide part 500*a* with respect to the forward/rearward direction "A". Furthermore, the light input parts 200*a*' and 200*a*" may be disposed to be spaced apart from the guide part 500*a*.

For example, referring to FIG. 4, the light input part 200*a*' may have a shape of an aspheric lens. As another example, referring to FIG. 5, the light input part 200*a*" may have a shape of a total internal reflection (TIR) lens. The TIR lens may be named 'a total reflection lens'.

Figure 6:
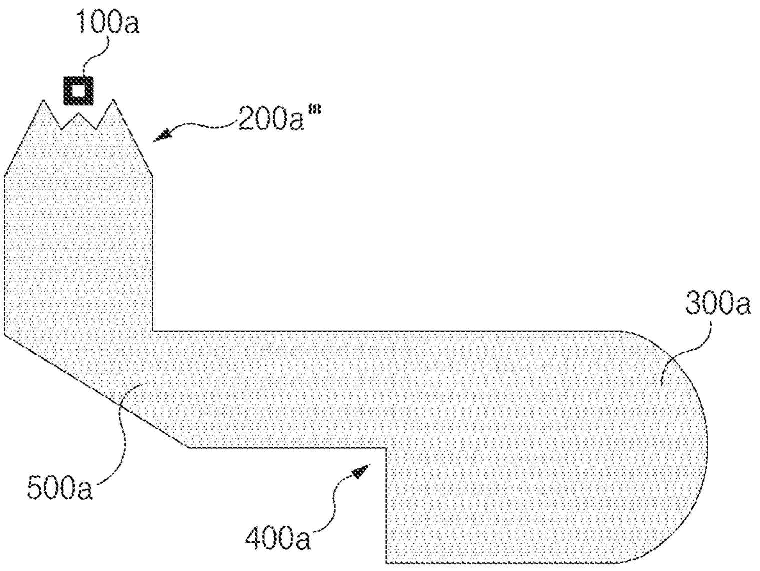
FIG. 6 is a view illustrating a light source and a light input part arranged along an upward/downward direction.

Meanwhile, the light input part 200*a*' and 200*a*' according to the embodiments that are different from the first embodiment of the present disclosure are not limited to the above-described contents, and referring to FIG. 6, a light input part 200*a*''' according to the embodiments that are different from the first embodiment may be oriented along an upward/downward direction "H".

The light input part 200*a*''' and the light source 100*a* may be arranged to be spaced apart from each other along the upward/downward direction "H". For example, the light input part 200*a*''' may be disposed on a lower side of the light source 100*a*. Furthermore, the light input part 200*a*''' may be attached to an upper end of the guide part 500*a*.

The guide part 500*a* according to the first and other embodiments may include an upward/downward guide area, a reflection guide area, and a forward/rearward guide area. The upward/downward guide area may extend from the light input part 200*a*''' to a lower side. The reflection guide area may extend from a lower end of the upward/downward guide area to a front side. In the reflection guide area, the light that passed through the light input part 200*a*''' may be reflected, and may travel toward the shield part 400*a*. The forward/rearward guide area may extend from a front end of the reflection guide area to the light output part 300*a* along the forward/rearward direction "A".

Referring back to FIG. 2, the light that passed through the guide part 500*a* may be output from the light output part 300*a* to an outside of the lamp 10*a*. The light output from the light output part 300*a* may travel to a front side. The light output part 300*a* may be disposed on a front side of the guide part 500*a*. The light output part 300*a* may have a shape that is convex to a front side. As an example, the light output part 300*a* may be an aspheric lens. The light output part 300*a* may include an upper light output area 310*a* and a lower light output area 320*a*.

The upper light output area 310*a* may define an upper portion of the light output part 300*a*. For example, the upper light output area 310*a* may mean an area of the light output part 300*a*, which is located on an upper side of the light output optical axis 300*x*. The light output from the upper light output area 310*a* may be named 'an upper light'. A curvature of the upper light output area 310*a* in the upward/downward direction "H" may be named a first curvature.

The upper light output area 310*a* may have a shape that is symmetrical in the leftward/rightward direction. Furthermore, the upper light output area 310*a* may have a shape that is rotationally symmetrical with respect to the light output optical axis 300*x*. For example, when a right area (an area that defines a right side of the upper light output area 310*a*)

of the upper light output area 310*a* is rotated about the light output optical axis 300*x* by a specific angle, the right area of the rotated upper light output area 310*a* may completely overlap a left area of the upper light output area 310*a* (an area that defines a left side of the upper light output area 310*a*) that is not rotated.

The lower light output area 320*a* may define a lower portion of the light output part 300*a*. For example, the lower light output area 320*a* may mean an area of the light output part 300*a*, which is located on a lower side of the light output optical axis 300*x*. The light output from the lower light output area 320*a* may be named 'a lower light'. A curvature of the lower light output area 320*a* in the upward/downward direction "H" may be named a second curvature.

The lower light output area 320*a* may have a shape that is symmetrical in the leftward/rightward direction. Furthermore, the lower light output area 320*a* may have a shape that is rotationally symmetrical with respect to the light output optical axis 300*x*. For example, when a right area (an area that defines a right side of the lower light output area 320*a*) of the lower light output area 320*a* is rotated around the light output optical axis 300*x* by a specific angle, a right area of the rotated lower light output area 320*a* may completely overlap a left area of the lower light output area 310*a* (an area that defines a left side of the lower light output area 320*a*) that is not rotated. The first curvature and the second curvature may be different from each other. For example, when the lights having the same wavelength are output from the upper light output area 310*a* and the lower light output area 320*a*, respectively, a degree of refraction may be different. As another example, an upper light output focus that is a focus of the upper light output area 310*a* and a lower light output focus that is a focus of a lower light output area 320*d* may be different from each other.

The upper light output focus may be located on the light output optical axis 300*x*. Furthermore, the lower light output focus may be located on a rear side of the upper light output focus. For example, when parallel light that travels toward a rear side is input to the lower light output area 320*a* from an outside, the parallel light input to the lower light output area 320*d* may pass through an area located on a rear side of the upper light output focus.

Furthermore, when the first curvature and the second curvature are different, as an example, a step may be formed in a connection area that is an area, in which the upper light output area 310*a* and the lower light output area 320*a* are connected to each other.

As another example, when no step is formed in the connection area, the upper light output area 310*a* has a shape that is symmetrical in the leftward/rightward direction and is rotationally symmetrical with respect to the light output optical axis 300*x*, and the lower light output area 320*d* may have a shape that is symmetrical in the leftward/rightward direction and is not rotationally symmetrical with respect to the light output optical axis 300*x*. However, the description of the shapes of the upper light output area 310*a* and the lower light output area 320*a* corresponds to an exemplary description, and the idea of the present disclosure is not necessarily limited to the examples.

The first curvature may be greater than the second curvature. In other words, a degree of bending of the upper light output area 310*a* with respect to the upward/downward direction "H" may be greater than a degree of bending of the lower light output area 320*a*. That is, a radius of curvature of the upper light output area 310*a* in the upward/downward direction "H" may be smaller than a radius of curvature of the lower light output area 320*a* in the upward/downward direction "H".

For example, with reference to the lights having the same wavelength, a degree of refraction of the light output from an upper reference point is refracted may be greater than a degree of refraction of the light output from a lower reference point. For example, the light output from the upper reference point may be refracted to be inclined toward a lower side with respect to a travel direction of the input light. Furthermore, the light output from the lower reference point may be refracted to be inclined toward an upper side with respect to the travel direction of the input light.

The upper reference point may mean an arbitrary point of the upper light output area 310*a*, which is spaced apart from the light output optical axis 300*x* to an upper side, and the lower reference point may mean an arbitrary point of the lower light output area, which is spaced apart from the light output optical axis 300*x* to a lower side. Furthermore, the upper reference point and lower reference point may be positioned at positions that are perpendicular to the upward/downward direction "H" and are symmetrical to each other with respect to the imaginary plane that passes through the light output optical axis 300*x*. That is, a spacing distance between the upper reference point and the imaginary plane in the upward/downward direction "H" may be the same as a spacing distance between the lower reference point and the imaginary plane in the upward/downward direction "H".

Furthermore, an angle formed by the light input to the upper reference point and the light output optical axis 300*x* may be the same as an angle formed by the light input to the lower reference point and the light output optical axis 300*x*.

Referring back to FIG. 2, among the lights output from the upper reference point, the light having a first wavelength, the light having the second wavelength, and the light having the third wavelength may be named a first upper wavelength light Rr1, a second upper wavelength light Rb1, and a third upper wavelength light Rg1, respectively.

Furthermore, among the lights output from the lower reference point, the light having the first wavelength, the light having the second wavelength, and the light having the third wavelength may be named a first lower wavelength light Rr2, a second lower wavelength light Rb2, and a third lower wavelength light Rg2, respectively.

For example, the light having the first wavelength may be observed as red by the user. For example, the first wavelength may be 630 nm or more and 780 nm or less.

Furthermore, as an example, the light having the second wavelength may be observed as blue by the user. The second wavelength may be shorter than the first wavelength. As an example, the second wavelength may be 380 nm or more and 420 nm or less.

Furthermore, as an example, the light having the third wavelength may be observed as green. The third wavelength may be shorter than the first wavelength and longer than the second wavelength. As an example, the third wavelength may be greater than 420 nm and less than 630 nm.

Furthermore, a first upper wavelength angle Ar1 that is an angle formed by the first upper wavelength light Rr1 and the light output optical axis 300*x* may be smaller than a first lower wavelength angle Ar2 that is an angle formed by the first lower wavelength light Rr2 and the light output optical axis 300*x*.

Furthermore, a second upper wavelength angle Ab1 that is an angle formed by the second upper wavelength light Rb1 and the light output optical axis 300*x* may be larger than a second lower wavelength angle Ab2 that is an angle formed by the second lower wavelength light Rb2 and the light output optical axis 300*x*.

Furthermore, a third upper wavelength angle that is an angle formed by the third upper wavelength light Rg1 and the light output optical axis 300*x* may be smaller than a third lower wavelength angle Ag2 that is an angle formed by the third lower wavelength light Rg2 and the light output optical axis 300*x*. Furthermore, as an example, the third upper wavelength angle may be 0 degrees. In other words, the third upper wavelength light Rg1 and the light output optical axis 300*x* may be parallel to each other.

A portion of the upper light, which has the first wavelength, and a portion of the lower light, which has the second wavelength may form a cutoff line. For example, a portion of the upper light, which has the first wavelength, may be the first upper wavelength light Rr1, and a portion of the lower light, which has the second wavelength, may be the second lower wavelength light Rb2. As a more detailed example, the first upper wavelength light Rr1 may be red light and the second lower wavelength light Rb2 may be blue light, and the red light and the blue light may overlap each other at the cutoff line.

In this way, as light components having different wavelengths overlap each other at the cutoff line through the difference between the first curvature and the second curvature, a prominent appearance of light of a specific wavelength at the cutoff line due to chromatic aberration may be minimized. In other words, due to chromatic aberration of the light components having different wavelengths, the cutoff line that is observed as purple or blue to the user may be minimized whereby a light distribution pattern with a chromaticity that satisfies the laws may be implemented.

The shield part 400*a* may prevent a portion of the light that passed through the light input part 200*a* from traveling to a front side. As an example, the shield part 400*a* may have a shape that is recessed into an upper side. Furthermore, the shield part 400*a* may be disposed between the light input part 200*a* and the light output part 300*a* with respect to the forward/rearward direction “A”. The shield part 400*a* may include a first area 410*a*, a second area 420*a*, and a third area 430*a*.

The first area 410*a* may reflect the first light that is any portion of the light that passed through the light input part 200*a*. For example, the first light may be reflected from an upper surface of the reflection area 410*a*. The first light reflected from the first area 410*a* may be output from the upper light output area 310*a*. The first area 410*a* may be named a reflection area 410*a'*.

The second area 420*a* may extend from a rear end of the first area 410*a* to a rear side. For example, the second area 420*a* may extend obliquely a rear side to be inclined toward a lower side with respect to the light output optical axis 300*x*. After passing through the light input part 200*a*, the light that reached the second area 420*a* is reflected to an upper side, and may be prevented from moving to a front side. The second area 420*a* may be named a light shielding area 420*a'*.

The third area 430*a* may extend from a front end of the first area 410*a* to a lower side. For example, the third area 430*a* may extend obliquely to a lower side to be inclined from a front end of the first area 410*a* to a front side. When the third area 430*a* is cut in the upward/downward direction “H”, the third area 430*a* may have a shape of a straight line. However, the present disclosure is not limited to the example, and when the third area 430*a* is cut in the upward/downward direction “H”, the third area may have a curved shape that is convex to a rear side.

The guide part 500*a* may guide travel of the light that passed through the light input part 200*a* to the light output part 300*a*. The guide part 500*a* may be disposed between the light input part 200*a* and the light output part 300*a* with respect to the forward/rearward direction “A”. For example, a rear end of the guide part 500*a* may be connected to a front end of the light input part 200*a*, and a front end of the guide part 500*a* may be connected to the light output part 300*a*. Furthermore, the light input part 200*a*, the light output part 300*a*, the shield part 400*a*, and guide part 500*a* may be integrally formed. The light input part 200*a*, the light output part 300*a*, the shield part 400*a*, and the guide part 500*a* may be one lens that is integrally formed.

Second Embodiment

Hereinafter, a lamp 10*b* according to the second embodiment of the present disclosure will be described with reference to FIGS. 8 and 9. In a description of the lamp 10*b* according to the second embodiment, a difference from the lamp 10*a* according to the first embodiment in the present disclosure is mainly described.

The lamp 10*b* according to the second embodiment of the present disclosure may include a light source 100*b*, a light input part 200*b*, a light output part 300*b*, a shield part 400*b*, and a guide part 500*b*. Meanwhile, for the contents regarding the light source 100*b*, the light input part 200*b*, the light output part 300*b*, and the guide part 500*b* according to the second embodiment of the present disclosure, the description of the light source 100*a*, the light input part 200*a*, the light output part 300*a*, and the guide part 500*a* according to the first embodiment of the present disclosure is used.

Furthermore, the light input part 200*b* may include a light input central part 210*b* and a light input outskirt part 220*b*. Furthermore, the light output part 300*b* may include an upper light output area 310*b* and a lower light output area 320*b*. For the description of the light input central part 210*b*, the light input outskirt part 220*b*, the upper light output area 310*b*, and the lower light output area 320*b* according to the second embodiment of the present disclosure, the description of the light input central part 210*a*, the light input outskirt part 220*a*, the upper light output area 310*a*, and the lower light output area 320*a* according to the first embodiment of the present disclosure is used.

The shield part 400*b* may include a first area 410*b*, a second area 420*b*, and a third area 430*b*. Meanwhile, for the contents regarding the second area 420*b* and the third area 430*b* according to the second embodiment of the present disclosure, the description of the second area 420*a* and the third area 420*b* according to the first embodiment of the present disclosure is used.

Figure 8:
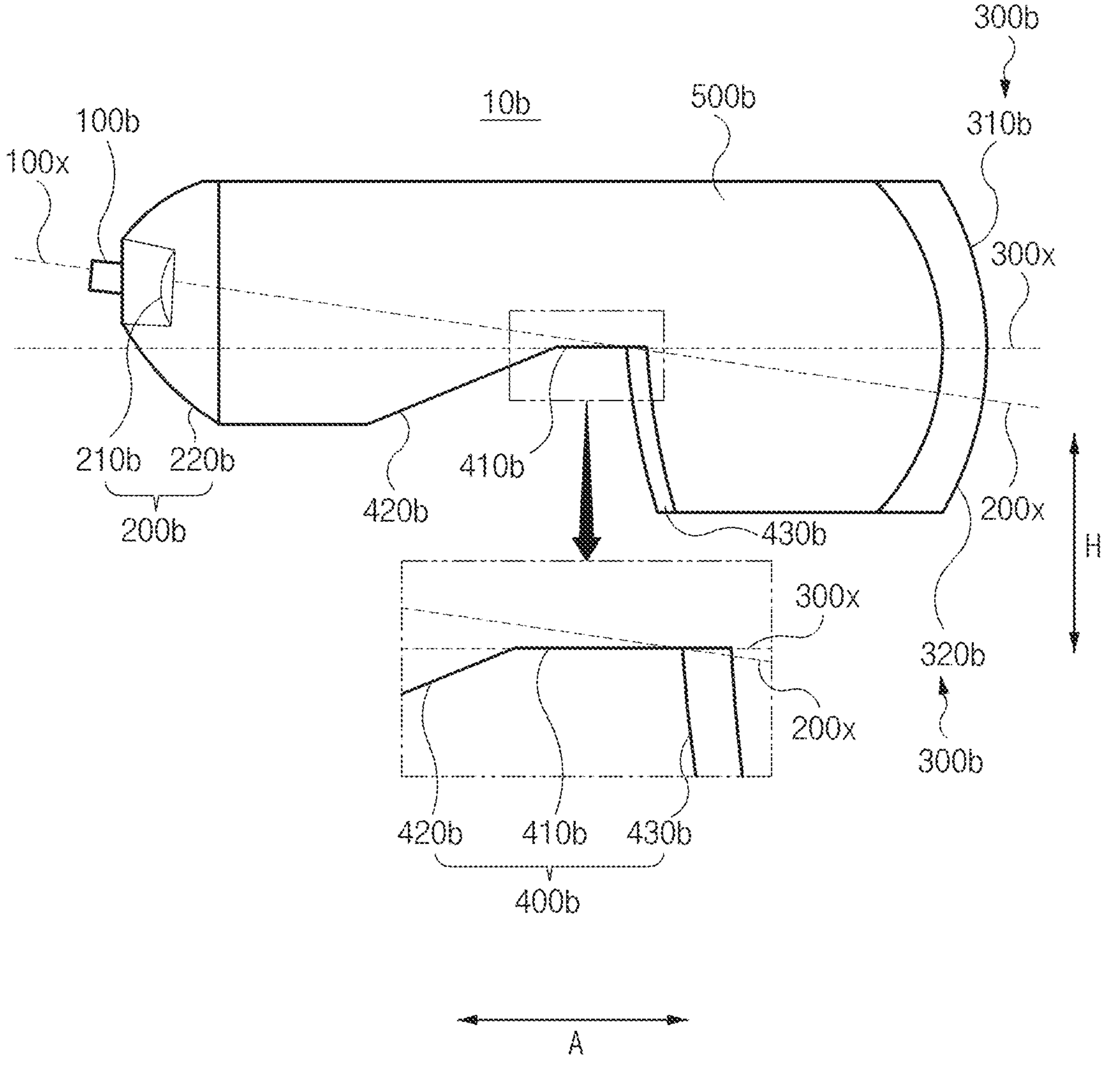
FIG. 8 is a longitudinal cross-sectional view of a lamp according to a second embodiment of the present disclosure.

Referring to FIG. 8, the first area 410*b* may be named ‘a reflection area 410*b*’. The reflection area 410*b* may extend in parallel to the forward/rearward direction “A”. Furthermore, the reflection area 410*b* may overlap the light output optical axis 300*x*. In other words, as an example, a height of the reflection area 410*b* in the upward/downward direction “H” may be equal to or smaller than a height of the light output optical axis 300*x*.

For example, when a height of the reflection area 410*b* in the upward/downward direction “H” is smaller than a height of the light output optical axis 300*x*, the reflection area 410*b* may be spaced apart from the light output optical axis 300*x* in the upward/downward direction “H”. As another example, when a height of the reflection area 410*b* in the upward/downward direction is the same as a height of the light output optical axis 300x, the reflection area 410b may overlap the light output optical axis 300x.

The reflection area 410b may be disposed on a lower side of the light source 100a. Furthermore, the reflection area 410b may be disposed on a lower side of the center of the light input part 200a.

In this way, as the reflection area 410b is parallel to the forward/rearward direction "A", an angle formed by the light that reached the reflection area 410b and the light output optical axis 300x may be the same as an angle formed by the light reflected by the reflection area 410b and the light output optical axis 300x.

For example, the reflection introduction angle and the reflection angle may be the same. The reflection introduction angle may be defined as an angle formed by the light output optical axis 300x and an imaginary straight line that extends in a reflection introduction direction. Furthermore, the reflection angle may be defined as an angle formed by the light output optical axis 300x and an imaginary straight line that extends in a reflection direction.

The reflection introduction direction may be defined as a travel direction of the first ray before the first ray reaches the reflection area 410b. The reflection direction may be defined as a travel direction of the first ray that is reflected in the reflection area 410b. The first ray may mean that any portion of the light output from the light output part 300a.

Figure 9:
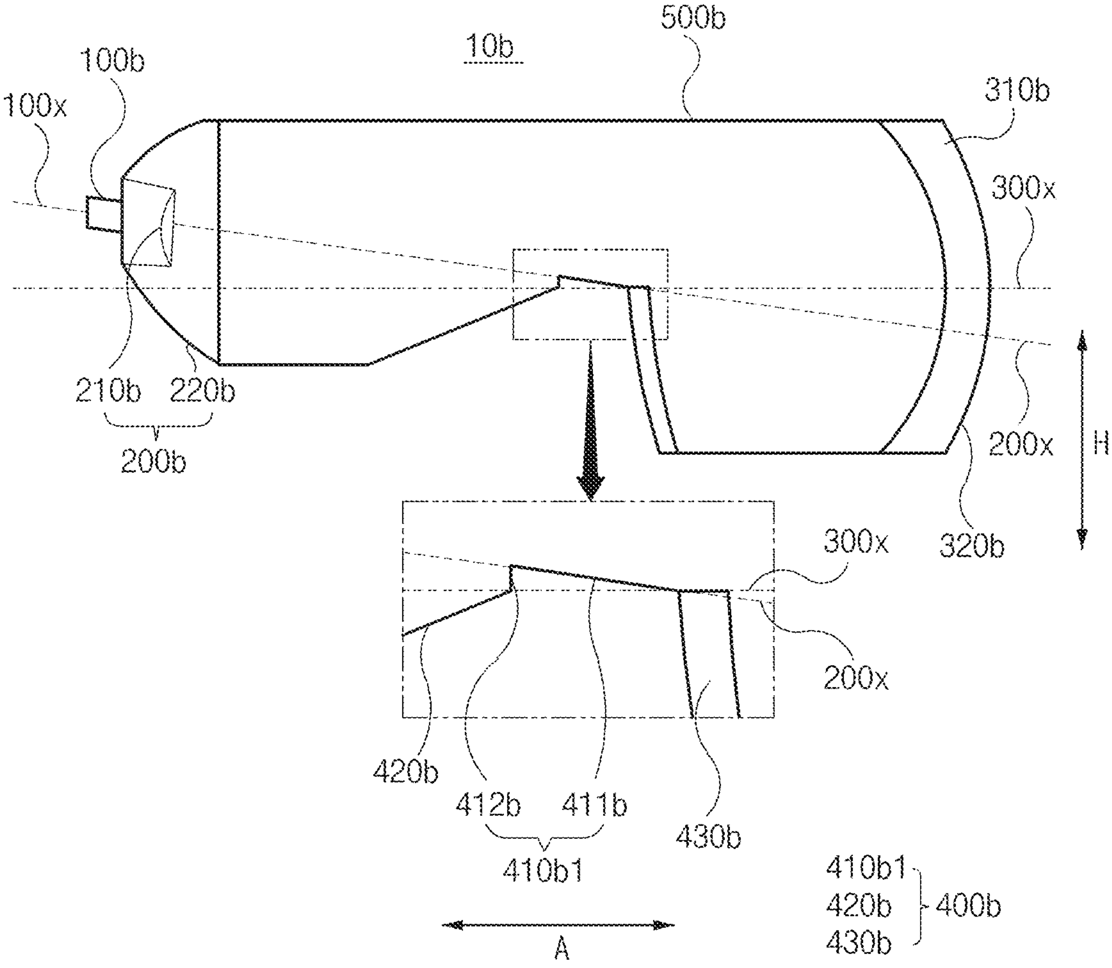
FIG. 9 is a longitudinal cross-sectional view of a lamp according to a second modification of the present disclosure.

Meanwhile, the idea of the present disclosure is not limited thereto, and referring to FIG. 9, the first area 410b1 according to a second modification of the present disclosure may include a reflection area 411b and an extension area 412b.

Furthermore, the reflection area 411b may extend in nonparallel to the light output optical axis 300x. For example, the reflection area 411b may extend obliquely to a rear side to be inclined to an upper side with respect to the light output optical axis 300x.

For example, when the lamp 10b is viewed in the leftward/rightward direction, the reflection area 411b and the light output optical axis 300x may form a specific angle. An angle formed by the reflection area 411b and the light output optical axis 300x may be greater than 0 degrees and not more than 5 degrees. Furthermore, as an example, an angle formed by the light input optical axis 200x and the light output optical axis 300x may be the same as an angle formed by the reflection area 411b and the output area 213b.

A height of a front end of the reflection area 411b may be disposed to be the same as a height of the light output optical axis 300x in the upward/downward direction "H". Furthermore, a rear end of the reflection area 411b may be disposed on an upper side of the light output optical axis 300x. Due to the reflection area 411b, the reflection angle may be smaller than the reflection introduction angle.

Furthermore, the reflection angle may be smaller than a reference angle. The reference angle may be defined as an angle that is formed by a reference line that passes through an upper end of the light output part 300a and a front end of the reflection area 411b, and the light output optical axis 300x when the lamp is viewed in the leftward/rightward direction. In this way, because the reflection angle is smaller than the reference angle, the reflection angle may be prevented from becoming excessively large. In this way, because the reflection angle is not formed to be excessively large, the reflected light reaches a rear side of the light output part 300a whereby the light may be prevented from being totally reflected by the light output part 300a. Furthermore, because the reflection angle is not formed to be excessively large, a light output efficiency of the lamp 10b may be improved by maximizing an amount of the light that reaches the light output part 300a.

Furthermore, the extension area 412b may extend from a rear end of the reflection area 411b to a lower side. Furthermore, a lower end of the extension area 412b may be connected to a front end of the second area 420b. In other words, the extension area 412b may extend along the upward/downward direction "H" between the rear end of the reflection area and the front end of the second area 420a. The second area 420b may be named 'a light shielding area 420b'.

Third Embodiment

Hereinafter, lamps 10c1 and 10c2 according to the third embodiment of the present disclosure will be described with reference to FIGS. 10 and 11. The lamps 10c1 and 10c2 may include a first optical module 10c1 and a second optical module 10c2.

Figure 10:
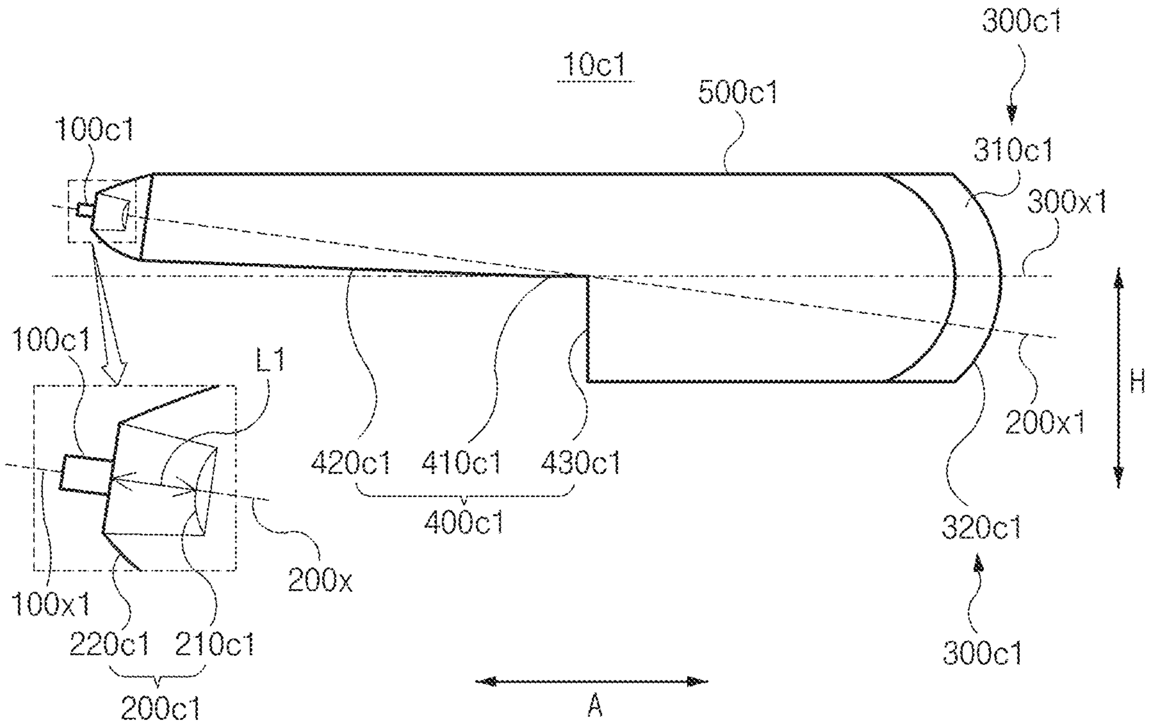
FIG. 10 is a longitudinal cross-sectional view of a first optical module according to a third embodiment of the present disclosure.

Referring to FIG. 10, the first optical module 10c1 may form a wide zone of a low beam light distribution pattern. Meanwhile, the present disclosure is not limited to the example, and the first optical module 10c1 may form an entire low beam light distribution pattern.

The first optical module 10c1 includes a first light source 100c1, a first light input part 200c1, a first light output part 300c1, a first shield part 400c1, and a first guide part 500c1. For the description of the first light output part 300c1 and the first guide part 500c1 according to the third embodiment of the present disclosure, the description of the light output part 300a and the guide part 500a according to the first embodiment of the present disclosure is used.

The first light output part 300c1 may include a first upper light output area 310c1 and a first lower light output area 320c1. For the description of the first upper light output area 310c1 and the first lower light output area 320c1 according to the third embodiment of the present disclosure, the description of the upper light output area 310a and the lower light output area 320a according to the first embodiment is used.

A height of a lower end of the first light input part 200c1 in the upward/downward direction "H" may be equal to or greater than a height of the first light output optical axis 300x1 in the upward/downward direction. The first light output optical axis 300x may mean an optical axis of the first light output part 300c1.

A center of the first light input part 200c1 may be located between an upper end of the light output part 300a and the light output optical axis 300x with respect to the upward/downward direction "H". Furthermore, a width of the first light input part 200c1 in the upward/downward direction "H" may be smaller than a width of the first light output part 300c1 in the upward/downward direction "H". For example, a width of the first light input part 200c1 in the upward/downward direction "H" may be equal to or greater than a width of the first upper light output area 310c1 in the upward/downward direction "H". The first upper light output area 310a may form an upper portion of the first light output part 300c1. Furthermore, with respect to the forward/rearward direction "A", the first light input part 200c1 may be disposed to face the first upper light output area 310c1.

The first light input optical axis 200x1 that is an optical axis of the first light input part 200c1 may be formed in parallel to the light source optical axis 100x1 that is an optical axis of the first light source 100c1. Furthermore, the first light input optical axis 200x1 may be defined as an imaginary straight line that passes through a front end of the first reflection area 410*c*1 and a center of the first light input part 200*c*1. Furthermore, the first light input optical axis 200*x*1 may extend obliquely to be inclined to a front side and a lower side with respect to the first light output optical axis 300*x*1. The first light output optical axis 300*x*1 may mean an optical axis of the first light output part 300*c*1. The first light output optical axis 300*x*1 may be parallel to the forward/rearward direction "A". The first light input part 200*c*1 may include a first light input central part 210*c*1 and a first light input outskirt part 220*c*1.

A distance between the first light input central part 210*a* and the first light source 100*a* may be named a first distance L1. For example, the first distance L1 may correspond to a depth of the first light input groove that is a light input groove of the first light input part 200*c*1.

The first light input groove may have a shape that is recessed to a front side on a rear side of the first light input part 200*c*1. The first light input groove may be a groove that is surrounded by an area, in which the light output from the first light source 100*c*1 of the first light input part 200*c*1 is input.

The first shield part 400*c*1 may include a first area 410*c*1, a second area 420*c*1, and a third area 430*c*1. For the description of the first area 410*c*1 according to the third embodiment of the present disclosure, the description of the first area 410*b* according to the second embodiment of the present disclosure is used. The first area 410*c*1 may be named 'a first reflection area 410*c*1'.

The second area 420*c*1 may be a surface that extends between a rear end of the first reflection area 410*c*1 and a lower end of the first light input part 200*c*1. The second area 420*c*1 may be named 'an extension surface 420*c*1'. A "H" height of the first reflection area 411*b* in the upward/downward direction may be equal to or greater than a height of a lower end of the first light input part 200*c*1 in the upward/downward direction "H". In this way, when the first light input part 200*c*1 is disposed on an upper side of the reflection area 411*b*, the light that passed through a lower portion of the first light input part 200*c*1 may not be shielded by the first shield part 400*c*1 and may be output from the first light output part 300*c*1. In other words, because all the light that passed through the first light input part 200*c*1 is output from the first light output part 300*c*1, an amount of the light output from the first optical module 10*c*1 is maximized. In this way, because the amount of the light output from the first optical module 10*c*1 is maximized, an output efficiency of the first optical module 10*c*1 may also be maximized.

The extension surface 420*c*1 may extend obliquely to a rear side to be inclined to an upper side. An angle formed by the extension surface 420*c*1 and the first light output optical axis 300*x*1 may be smaller than an angle formed by the first light input optical axis 200*x*1 and the first light output optical axis 300*x*. The extension surface 420*c*1 may be exposed to an outside of the first optical module 10*c*1.

The third area 430*c*1 may extend from a front end of the first reflection area 411*b* to a lower side. For example, the third area 430*c*1 may extend perpendicular to the forward/rearward direction "A". Furthermore, with respect to the forward/rearward direction "A", the third area 430*c*1 may be disposed to face the first lower light output area 320*c*1. Furthermore, a width of the third area 430*c*1 in the upward/downward direction "H" may be the same as a width of the first lower light output area 320*a* in the upward/downward direction "H".

Figure 11:
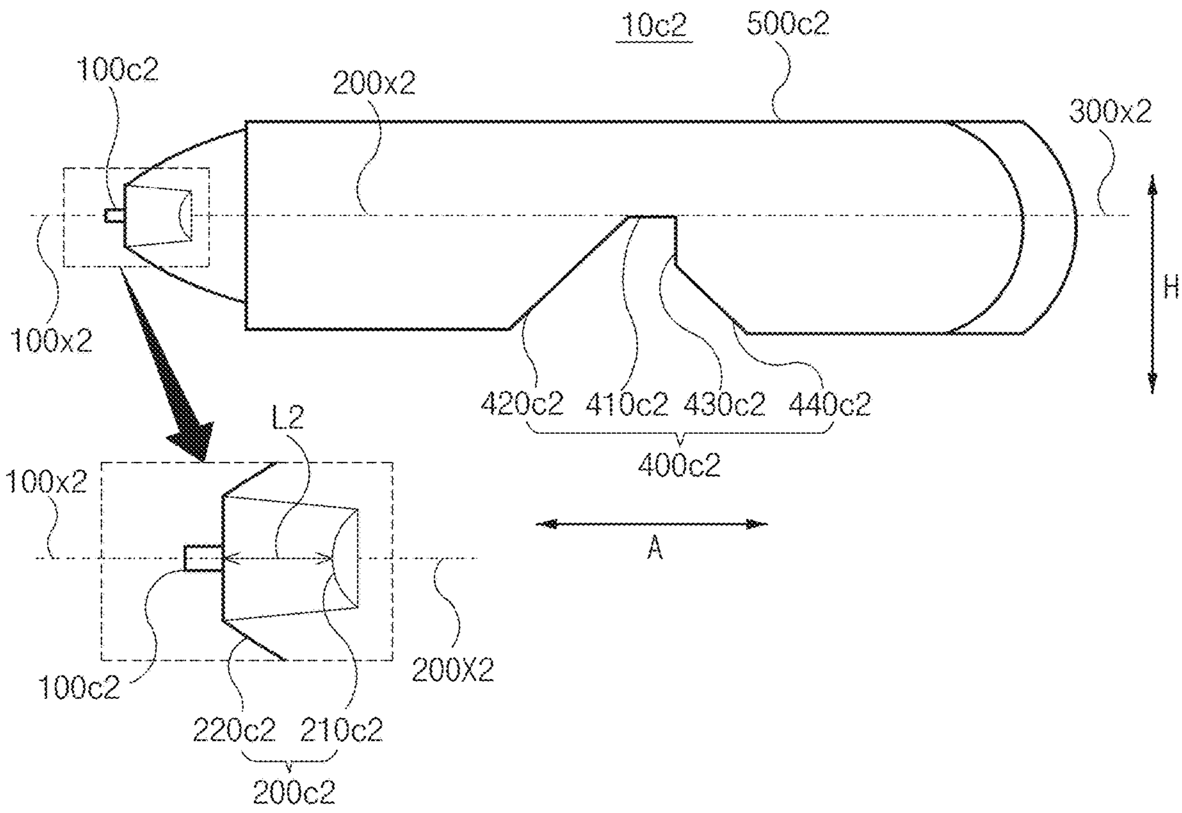
FIG. 11 is a longitudinal cross-sectional view of a second optical module according to a third embodiment of the present disclosure.

Referring to FIG. 11, the second optical module 10*c*2 may form a hot zone of a low beam light distribution pattern. Meanwhile, the present disclosure is not limited to the example, and the second optical module 10*c*2 may form an entire low beam light distribution pattern.

The wide zone of the low beam light distribution pattern formed by the first optical module 10*c*1 and the hot zone of the low beam light distribution pattern formed by the second optical module 10*c*2 may overlap each other to form a low beam light distribution pattern.

The second optical module 10*c*2 may include a second light source 100*c*2, a second light input part 200*c*2, a second light output part 300*c*2, a second shield part 400*c*2, and a second guide part 500*c*2. For the description of each of the second light output part 300*c*2 and the second guide part 500*a* according to the third embodiment of the present disclosure, the description of the light output part 300*a* and the guide part 500*a* according to the first embodiment of the present disclosure is used.

The second light output part 300*c*2 may include a second upper light output area 310*c*2 and a second lower light output area 320*c*2. For the description of each of the second upper light output area 310*c*2 and the second lower light output area 320*c*2 according to the third embodiment of the present disclosure, the description of the upper light output area 310*a* and the lower light output area 320*a* according to the first embodiment is used.

The second light source optical axis 100*x*2 that is an optical axis of the second light source 100*a* may extend in parallel to the forward/rearward direction "A". The second light source optical axis 100*x*2 may be parallel to the second light input optical axis 200*x*2 that is an optical axis of the second light input part 200*c*2. Furthermore, the second light source optical axis 100*x*2, the second light input optical axis 200*x*2, and the second light output optical axis 300*x*2 may be parallel to each other. The second light output optical axis 300*x*2 may mean an optical axis of the second light output part 300*c*2.

A diameter of the second light input part 200*c*2 may be different from a diameter of the first light input part 200*c*1. For example, the diameter of the first light input part 200*c*1 may be smaller than the diameter of the second light input part 200*c*2. The diameter of the first light input part 200*c*1 may mean a width of the first light input part 200*c*1 in a direction that is perpendicular to the first light input optical axis 200*x*1. Furthermore, the diameter of the second light input part 200*c*2 may mean a width of the second light input part 200*c*2 in a direction that is perpendicular to the second light input optical axis 200*x*.

The second light input part 200*c*2 may include a second light input central part 210*c*2 and a second light input outskirt part 220*c*2. A spacing distance between the second light input central part 210*a* and the second light source 100*c*2 may be named a second distance L2. For example, the second distance L2 may correspond to a depth of the second light input groove that is a light input groove of the second light input part 200*c*2.

The second light input groove may have a shape that is recessed to a front side on a rear side of the second light input part 200*c*2. The second light input groove may be a groove that is surrounded by an area, in which the light output from the second light source 100*c*2 of the second light input part 200*c*2 is input.

Furthermore, a diameter of the first light input groove may be smaller than a diameter of the second light input groove. For example, the diameter of the first light input groove may mean a width of the first light input groove in a direction that is perpendicular to the first light input optical axis 200*x*1. Furthermore, the diameter of the second light input groove may mean a width of the second light input groove in a direction that is perpendicular to the second light input optical axis 200*x*2.

Furthermore, a first brightness that is a maximum brightness (a maximum luminous intensity) of the light that passed through the first light input part 200*c*1 may be smaller than a second brightness that is a maximum brightness of the light that passed through the second light input part 200*c*2. Furthermore, the maximum brightness of the first optical module 10*c*1 may be smaller than the maximum brightness of the second optical module 10*c*2. Furthermore, an amount of the light output from the first optical module 10*c*1 may be greater than an amount of the light output from the second optical module 10*c*2. In this way, the second optical module 10*c*2 has a structure that may implement a high brightness with a small amount of light.

The brightness of the light that passed through the first light input part 200*c*1 may mean the number of, among the lights that passed through the first light input part 200*c*1, rays that exist within a unit solid angle range in a direction of a first light source optical axis 100*x*1. Furthermore, the brightness of the light that passed through the second light input part 200*c*2 may mean the number of, among the lights that passed through the second light input part 200*c*2, rays that exist within a unit solid angle range in a direction of the second light source optical axis 100*x*2.

Furthermore, the second distance L2 may be greater than the first distance L1. For example, as a difference between the second distance L2 and the first distance L1 increases, a difference between the second brightness and the first brightness may also increase. In other words, depending on a spacing distance between the light source and the light input outskirt part, the brightness of the light that passed through the light input part may be changed.

The second shield part 400*c*2 may include a first area 410*c*2, a second area 420*c*2, a third area 430*c*2, and a fourth area 440*c*2. For the description of each of the first area 410*c*2 and the second area 420*c*2 according to the third embodiment of the present disclosure, the description of the first area 410*a* and the second area 420*a* according to the first embodiment of the present disclosure may be used.

The third area 430*c*2 may extend from a front end of the second area 420*c*2 to a lower side. For example, the third area 430*c*2 may extend in parallel to the upward/downward direction "H".

The fourth area 440*c*2 may extend obliquely to a rear side to be inclined from a lower end of the third area 430*c*2 to a lower side. A height of a lower end of the fourth area 440*c*2 in the upward/downward direction "H" may be the same as a height of a lower end of the second light output part 300*c*2 in the upward/downward direction "H".

Fourth Embodiment

Figure 12:
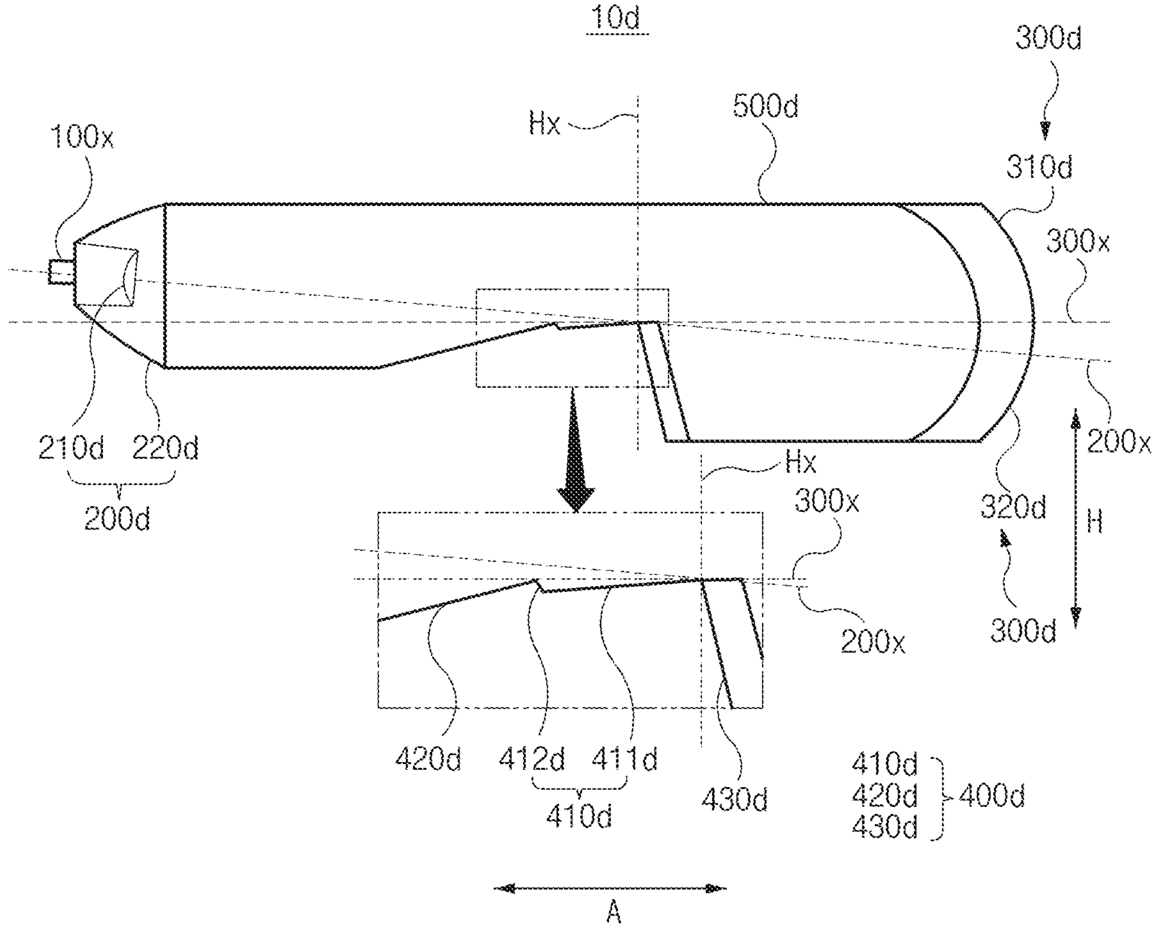
FIG. 12 is a longitudinal cross-sectional view of a lamp according to a fourth embodiment of the present disclosure.

Hereinafter, a lamp 10*d* according to the fourth embodiment of the present disclosure will be described with reference to FIG. 12. In a description of the lamp 10*d* according to the fourth embodiment, a difference from the lamps according to the first to third embodiments of the present disclosure will be mainly described.

The lamp 10*d* according to the fourth embodiment of the present disclosure may include a light source 100*d*, a light input part 200*d*, a light output part 300*d*, a shield part 400*d*, and a guide part 500*d*. Meanwhile, for the description of the light source 100*d*, the light input part 200*d*, the light output part 300*d*, and the guide part 500*d* according to the fourth embodiment of the present disclosure, the description of the light source 100*a*, the light input part 200*a*, the light output part 300*a*, and the guide part 500*a* according to the first embodiment of the present disclosure is used.

The light input part 200*d* may include a light input central part 210*d* and a light input outskirt part 220*d*. Furthermore, the light output part 300*d* may include an upper light output area 310*d* and a lower light output area 320*d*. Meanwhile, for the description of the light input central part 210*d*, the light input outskirt part 220*d*, the upper light output area 310*d*, and the lower light output area 320*d* according to the fourth embodiment of the present disclosure, the description of the light input central part 210*a*, the light input outskirt part 220*a*, the upper light output area 310*a*, and the lower light output area 320*a* according to the first embodiment of the present disclosure is used.

The shield part 400*d* may include a first area 410*d*, a second area 420*d*, and a third area 430*d*. The first area 410*d* may have a shape that protrudes to a lower side. However, the present disclosure is not limited to the example, and the first area 410*d* may have a shape that is parallel to the light output optical axis 300*x*. The first area 410*d* may include a reflection area 411*d* and an extension area 412*d*.

The reflection area 411*d* may reflect any portion of the light that passed through the light input part 200*d*. The reflection area 411*d* may extend obliquely to a rear side to be inclined to a lower side with respect to the light output optical axis 300*x*. For example, a height of the front end of the reflection area 411*d* in the upward/downward direction "H" may be the same as a height of the light output optical axis 300*x* in the upward/downward direction "H". Furthermore, a rear end of the reflection area 411*d* may be disposed on a lower side of the light output optical axis 300*x*.

The extension area 412*d* may extend from a rear end of the reflection area 411*d* to an upper side. For example, the extension area 412*d* may extend obliquely to an upper side to be inclined to a rear side. The extension area 412*d* may be connected to a front end of the second area 420*d*. In other words, the extension area 412*d* may extend obliquely between a front end of the second area 420*d* and a rear end of the reflection area 411*d*. A height of an upper end of the extension area 412*d* in the upward/downward direction "H" may be the same as a height of the light output optical axis 300*x* in the upward/downward direction "H".

The second area 420*d* may prevent the light that passed through the light input part 200*d* from traveling to a front side. The second area 420*d* may be named 'a light shielding area 420*d*'. The light shielding area 420*d* may be disposed on an upper side of a lower end of the light output part 300*a*.

The third area 430*d* may define a front side of the shield part 400*d*. The third area 430*d* may be named 'a front area 430*d*'. Output reflected light may reach the front area 430*d*. The output reflected light may mean, among the lights that reached the light output part 300*d*, light that is reflected (as an example, totally reflected) from the light output part 300*d* and travels to a rear side.

The front area 430*d* may extend obliquely to a front side to be inclined to a lower side with respect to the light output optical axis 300*x*. For example, the front area 430*d* may extend obliquely to a front side from a front end of the reflection area 411*d* to be inclined to a lower side A height of an upper end of the front area 430*d* in the upward/downward direction may be the same as a height of the light output optical axis 300*x* in the upward/downward direction "H". In other words, the upper end of the front area 430*d* may cross the light output optical axis 300*x*.

Furthermore, when the lamp 10*d* is viewed in the leftward/rightward direction, the front area 430*d* may have a shape of a straight line. For example, when the lamp 10*d* is viewed in the leftward/rightward direction, the front area 430*d* may have a diagonal shape extending to a front side and a lower side. When the lamp 10*d* is viewed in the leftward/rightward direction, the front area 430*d* may have a shape that is inclined to a front side with respect to an upward/downward reference line Hx. The upward/downward reference line Hx may be defined as an imaginary straight line that passes through a front end of the reflection area 411*d* and extends in the upward/downward direction "H".

In this way, because the front area 430*d* has a shape that is inclined to a front side with respect to the upward/downward reference line Hx, the output reflected light that reached the front area 430*d* may be totally reflected in the front area 430*d* and input of the output reflected light to the light output part 300*d* may be minimized. In this way, when the output reflected light is totally reflected in the front area 430*d* and the input to the light output part 300*d* is minimized, the output reflected light may be output from the light output part 300*d* whereby glare to the user may be minimized.

The output reflected light that reached the front area 430*d* may be output from the front area 430*d*. For example, the output reflected light may be refracted to an upper side when being output from the front area 430*d*. The light refracted and output from the front area 430*d* may be input to the first area 410*d* (e.g., the reflection area 411*d*). The light input to the first area 410*d* may pass through a first guide area, which will be described later, and may be output from an upper end of the guide part 500*d*.

The guide part 500*d* may include a first guide area and a second guide area. The first guide area may be disposed on an upper side of the reflection area 411*d*. The first guide area may mean an area that is located on an upper side of the guide part 500*d* with respect to the light output optical axis 300*x*.

The first guide area may extend from the upper light output area 310*d* to a rear side. A width of the first guide area in the upward/downward direction "H" may be the same as a width of the upper light output area 310*a* in the upward/downward direction "H".

The second guide area may mean an area that is located on a lower side of the guide part 500*d* with respect to the light output optical axis 300*x*. The second guide area may guide travel of the output reflected light to a rear side. In other words, the second guide area may guide the light reflected from the light output part 300*d* to the front area 430*d*. The second guide area may extend in the forward/rearward direction "A" between the front area 430*d* and the lower light output area 320*d*.

Fifth Embodiment

Figure 13:
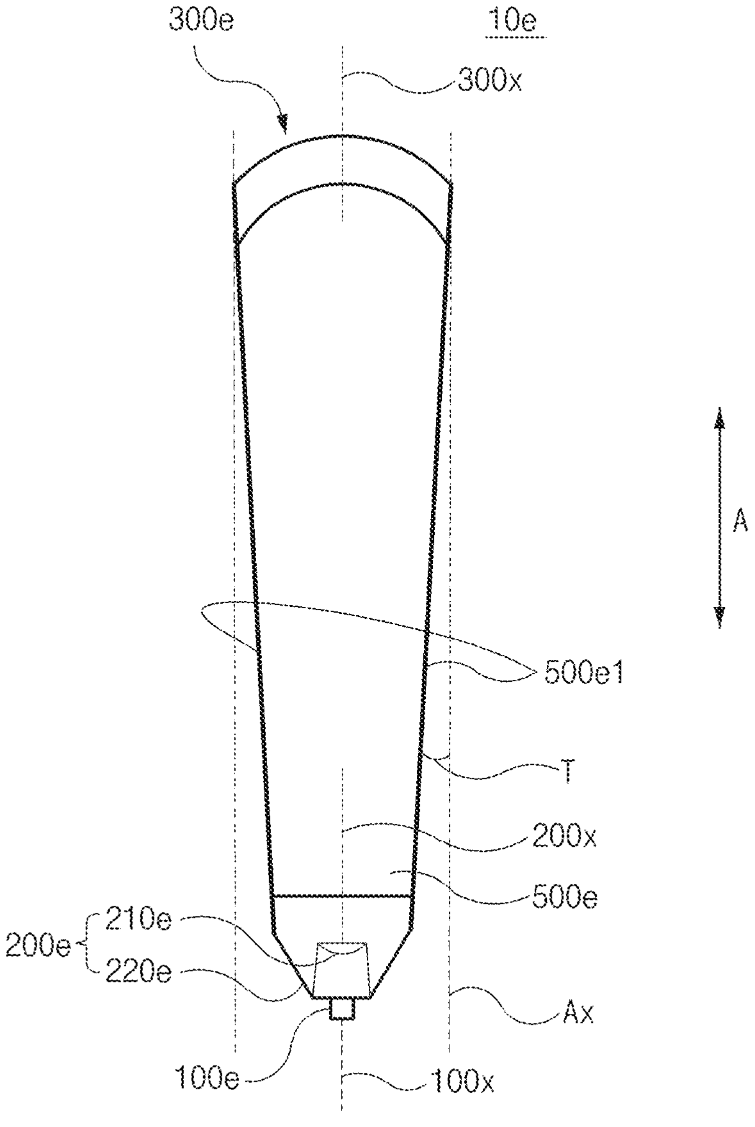
FIG. 13 is a transverse cross-sectional view of a lamp according to a fifth embodiment of the present disclosure.

Hereinafter, a lamp 10*e* according to the fifth embodiment of the present disclosure will be described with reference to FIG. 13. In a description of the lamp 10*e* according to the fifth embodiment, a difference from the lamps according to the first to fourth embodiments of the present disclosure are mainly described.

The lamp 10*e* according to the fifth embodiment of the present disclosure may include a light source 100*e*, a light input part 200*e*, a light output part 300*e*, a shield part (not illustrated), and a guide part 500*e*. For the description of the light source 100*e*, the light input part 200*e*, the light output part 300*e*, and the shield part (not illustrated) according to the fifth embodiment of the present disclosure, the description of the light source 100*a*, the light input part 200*a*, the light output part 300*a*, and the shield part 400*a* according to the first embodiment of the present disclosure is used.

The light input part 200*e* may include a light input central part 210*e* and a light input outskirt part 220*e*. Furthermore, the light output part 300*d* may include an upper light output area and a lower light output area. Meanwhile, for the description of the light input central part 210*e*, the light input outskirt part 220*e*, the upper light output area, and the lower light output area according to the fifth embodiment of the present disclosure, the description of the light input central part 210*a*, the light input outskirt part 220*a*, the upper light output area 310*a*, and the lower light output area 320*d* according to the first embodiment of the present disclosure is used.

The guide part 500*e* may be divided into a plurality of areas with respect to the forward/rearward direction "A". In at least some of the plurality of areas, a width of the first area in the leftward/rightward direction and a width of the second area in the leftward/rightward direction may be different from each other. For example, when the first area is located on a front side of the second area, a width of the first area in the leftward/rightward direction may be greater than a width of the second area in the leftward/rightward direction. In other words, in at least some of the plurality of areas, a width of the area relatively located on a front side in the leftward/rightward direction may be greater than a width of the area relatively located on a rear side in the leftward/rightward direction.

For example, the guide part 500*e* may have a tapered shape, in which a width thereof in the leftward/rightward direction tapers to become smaller toward a rear side of the lamp where the light source 100*e* is located. On the left side and the right side of the guide part 500*e*, inclined surfaces 500*e*1 that extend obliquely to the rear side of the lamp to be inclined toward an inside of the lamp 10*e*, respectively, may be formed. The inclined surfaces 500*e*1 may form a specific angle "T" with a forward/rearward reference line Ax. The forward/rearward reference line Ax may mean an imaginary straight line that extends in the forward/rearward direction "A", with the forward direction being toward the front part of the lamp 10*e*, where the light output part 300*e* is located, and the rearward direction being toward the rear part of the lamp where the light source 10*e* is located.

A width of the front end of the guide part 500*e* in the leftward/rightward direction may be the same as a width of the light output part 300*e* in the leftward/rightward direction. Furthermore, a width of the rear end of the guide part 500*e* in the leftward/rightward direction may be equal to or greater than a width of the light input part 200*e* in the leftward/rightward direction.

In an inclined surface 500*e*1, a portion of the light totally reflected by the light input outskirt part 220*e* may be reflected. For example, an angle formed by the inclined ray and the forward/rearward reference line Ax before the inclined ray reaches the inclined surface 500*e*1 may be greater than an angle formed by the inclined ray reflected by the inclined surface 500*e*1 and the forward/rearward reference line Ax. The inclined ray may mean one arbitrary ray of the light that is totally reflected by the light input outskirt part 220*e*.

When the inclined ray is reflected by the inclined surface 500*e*1, a degree of inclination of the inclined ray with respect to the forward/rearward reference line Ax may be reduced. In other words, when the inclined ray is reflected by the inclined surface 500*e*1, a degree of bending may be reduced. Accordingly, the inclined ray reflected by the inclined surface **500*e*1 may travel to be close to parallel to the forward/rearward direction "A". In this way, when an inclination of the inclined ray with respect to the forward/rearward reference line Ax is reduced by the inclined surface 500*e*1, an amount of the light output from the light output part 300*e*** may be maximized.

The inclined surface formed on a left side of the guide part **500*e* may be named 'a left inclined surface' or 'a first inclined surface'. The first inclined surface may have a shape that extends to a rear side to be inclined to a right side. Furthermore, the first inclined surface may reflect a portion of the light totally reflected by the light input outskirt part 220*e* to a right side. For example, the first inclined surface may reflect a portion of the light totally reflected from a right side of the light input outskirt part 220*e* to a right side. After being reflected by the first inclined surface, the light output from the light output part 300*e*** may form a right side of the wide zone.

Furthermore, the inclined surface formed on the right side of the guide part **500*e* may be named 'a right inclined surface' or 'a second inclined surface'. The second inclined surface may have a shape that extends to a rear side to be inclined to a left side. Furthermore, the second inclined surface may reflect a portion of the light totally reflected by the light input outskirt part 220*e* to a left side. For example, the second inclined surface may reflect a portion of the light totally reflected from a left side of the light input outskirt part 220*e* to a left side. After being reflected from the second inclined surface, the light output from the light output part 300*e*** may form a left side of the wide zone.

Furthermore, the left inclined surface and right inclined surface may have shapes that are symmetrical to each other with respect to a reference plane. The reference plane may be defined as an imaginary plane that is perpendicular to the leftward/rightward direction and passes through a center of the lamp **10*e* (as an example, a center of the guide part 500*e***).

The lamp according to the present disclosure minimizes the light totally reflected from the light output surface whereby a light output efficiency is improved.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. Unless defined differently, all the terms including technical or scientific terms have the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplary description of the technical spirits of the present disclosure, and an ordinary person in the art, to which the present disclosure pertains, may make various corrections and modifications without departing from the essential characteristics of the present disclosure. Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

What is claimed is:

1. A lamp comprising:

a light source configured to output light into the lamp, wherein the light source is located at a rear side of the lamp;

a light output part located at a front side of the lamp spaced apart from the light source, and configured to output the light output from the light source after the light is input into the rear side of the lamp by the light source; and a guide part configured to guide travel of the light output from the light source such that the light travels to the light output part through the guide part, wherein the guide part extends from the rear side of the lamp to the light output part, wherein:

the guide part is divided into a plurality of areas with respect to a forward/rearward direction of the lamp that extends forward from the rear side of the lamp to the front side of the lamp, a width of an area of the guide part located at a front side of the guide part in a leftward/rightward direction of the lamp, within a group of at least some of the plurality of areas of the guide part, is greater than a width of another area of the guide part located at a rear side of the guide part, within the group of at least some of the plurality of areas, in the leftward/rightward direction, and the lamp further comprises:

a light input part to which the light output from the light source is input and disposed at a rear end of the guide part between an output of the light source and the rear end of the guide part, wherein the light input part includes:

a light input central part which has a convex surface which faces the output of the light source and is configured to refract a central light which is a first portion of the light output from the light source such that the central light travels toward a focus of the light output part; and a light input outskirt part spaced apart from and facing the light input central part, wherein:

the light input outskirt part surrounds the light input central part and includes an inner area that defines an inner peripheral surface of the light input outskirt part and an outer area that defines an outer peripheral surface of the light input outskirt part, and the input outskirt part is configured so that light that passes through the inner area is refracted to the outer area where it is reflected and travels to the focus of the light output part, wherein:

the guide part has a tapered shape, such that a width of the guide part in the leftward/rightward direction tapers to become smaller toward the rear side of the lamp;

the guide part includes inclined side surfaces, forming the tapered shape, extending to be inclined from the front side of the lamp to the rear side of the lamp toward an inside of the lamp;

a reference plane is defined by an imaginary plane passing through a center of the lamp and perpendicular to the leftward/rightward direction; and the input outskirt part and the inclined side surfaces of the guide part are configured so that a first angle of inclination, relative to the reference plane, at one of the inclined side surfaces of an inclined light ray that is reflected off of the outer area of the input outskirt part before the inclined light ray reaches the one of the inclined surfaces is greater than a second angle of inclination formed by the inclined light ray and the reference plane after the inclined light ray is reflected off of the one of the inclined surfaces.

2. The lamp of claim 1, wherein the inclined side surfaces are formed in a left side and in a right side of the guide part to form a left inclined surface and a right inclined surface, respectively.

3. The lamp of claim 2, wherein the left inclined surface provided on the left side of the guide part and the right inclined surface provided on the right side of the guide part are symmetrical to one another with respect to the reference plane.

4. The lamp of claim 2, wherein the light input outskirt part is configured to reflect a peripheral light which is another portion of the light output from the light source such that the peripheral light travels toward a focus of the light output part.

5. The lamp of claim 4, wherein:

among the inclined side surfaces of the guide part, an inclined side surface provided on one side of the guide part in the leftward/rightward direction is a first inclined surface, and the first inclined side surface reflects at least a portion of the peripheral light totally reflected by the light input outskirt part to an opposite side of the lamp in the leftward/rightward direction.

6. The lamp of claim 5, wherein:

light output from the light output part forms a low beam light distribution pattern for a vehicle on which the lamp is mounted, the low beam light distribution pattern includes: a hot zone, and a wide zone, a luminous intensity of which is lower than a luminous intensity of the hot zone, and when, among the inclined sides surfaces of the guide part, an inclined side surface provided on an opposite side of the guide part in the leftward/rightward direction is a second inclined side surface, the light output from the light output part after being reflected by the first inclined side surface forms an opposite side of the wide zone in the leftward/rightward direction, and the light output from the light output part, after being reflected by the second side inclined surface, forms one side of the wide zone in the leftward/rightward direction.

* * * * *